(12) United States Patent
Matsumoto et al.

(10) Patent No.: US 10,761,531 B2
(45) Date of Patent: Sep. 1, 2020

(54) GUIDANCE CONTROL SYSTEM FOR AUTONOMOUS-TRAVELING VEHICLE

(71) Applicant: KPIT TECHNOLOGIES LIMITED, Hinjewadi, Pune (IN)

(72) Inventors: Keiji Matsumoto, Osaka (JP); Hidekazu Niu, Osaka (JP); Prashantkumar Bipinchandra Vora, Pune (IN); Rituraj Shrivastava, Pune (IN); Manuj Sharma, Pune (IN); Soumyo Das, Pune (IN)

(73) Assignee: KPIT TECHNOLOGIES LIMITED, Hinjewadi, Pune (IN)

( * ) Notice: Subject to any disclaimer, the term of this patent is extended or adjusted under 35 U.S.C. 154(b) by 312 days.

(21) Appl. No.: 15/805,644

(22) Filed: Nov. 7, 2017

(65) Prior Publication Data

US 2018/0321682 A1    Nov. 8, 2018

Related U.S. Application Data

(63) Continuation of application No. PCT/JP2015/084338, filed on Dec. 7, 2015.

(30) Foreign Application Priority Data

May 7, 2015    (IN) .......................... 1824/MUM/2015

(51) Int. Cl.
*G05D 1/00*    (2006.01)
*G05D 1/02*    (2020.01)
(Continued)

(52) U.S. Cl.
CPC ............ *G05D 1/0088* (2013.01); *G01S 19/45* (2013.01); *G05D 1/0055* (2013.01);
(Continued)

(58) Field of Classification Search
CPC .... A01B 69/008; G01S 19/45; G05D 1/0055; G05D 1/0088; G05D 1/0212; G05D 1/0278; G05D 1/0891; G05D 2201/0201
See application file for complete search history.

(56) References Cited

U.S. PATENT DOCUMENTS

| | | | | |
|---|---|---|---|---|
| 6,345,231 B2 * | 2/2002 | Quincke | ............. | A01B 79/005 37/348 |
| 7,400,956 B1 * | 7/2008 | Feller | ................... | A01B 69/008 342/357.36 |

(Continued)

FOREIGN PATENT DOCUMENTS

| | | |
|---|---|---|
| JP | H05333928 A | 12/1993 |
| JP | H0713619 A | 1/1995 |
| JP | 2002358122 A | 12/2002 |

OTHER PUBLICATIONS

International Search Report for corresponding to International Application No. PCT/JP2015/084338; dated Feb. 9, 2016.

*Primary Examiner* — Babar Sarwar
(74) *Attorney, Agent, or Firm* — Cantor Colburn LLP

(57) ABSTRACT

The present invention is an induction control system for an autonomous-traveling vehicle that performs traveling and work autonomously while measuring the position of the traveling vehicle by using a satellite positioning system, the induction control system being characterized by, when the autonomous-traveling vehicle is moved backward, setting a virtual antenna position more backward, by a predetermined distance, than the antenna position of the satellite positioning system, and performing a lateral control by using a lateral deviation from a target path at the virtual antenna position. This makes it possible to travel along a pre-designed target path during a forward movement, turning, and a backward movement of the autonomous-traveling vehicle.

6 Claims, 17 Drawing Sheets

(51) Int. Cl.
    *G01S 19/45*     (2010.01)
    *G05D 1/08*     (2006.01)
    *A01B 69/04*     (2006.01)

(52) U.S. Cl.
    CPC ......... *G05D 1/0212* (2013.01); *G05D 1/0278* (2013.01); *G05D 1/0891* (2013.01); *A01B 69/008* (2013.01); *G05D 2201/0201* (2013.01)

(56) References Cited

U.S. PATENT DOCUMENTS

| | | | |
|---|---|---|---|
| 9,886,038 B2* | 2/2018 | Webber | E02F 9/2045 |
| 10,126,754 B2* | 11/2018 | Ogura | G05D 1/0219 |
| 2003/0016147 A1* | 1/2003 | Evans | G08G 1/205 |
| | | | 340/988 |
| 2006/0041354 A1* | 2/2006 | Schick | G05D 1/0278 |
| | | | 701/41 |
| 2012/0127032 A1* | 5/2012 | McClure | G01S 19/13 |
| | | | 342/357.44 |
| 2013/0080000 A1* | 3/2013 | Von der Lippe | E01C 23/088 |
| | | | 701/50 |
| 2014/0168009 A1* | 6/2014 | Peake | G01C 21/165 |
| | | | 342/357.34 |
| 2014/0324291 A1* | 10/2014 | Jones | G05D 1/0278 |
| | | | 701/41 |
| 2016/0011597 A1* | 1/2016 | Webber | E02F 9/2045 |
| | | | 701/25 |
| 2017/0168501 A1* | 6/2017 | Ogura | G05D 1/0022 |
| 2017/0177002 A1* | 6/2017 | Ogura | A01B 69/008 |
| 2017/0248946 A1* | 8/2017 | Ogura | A01B 69/001 |
| 2017/0258008 A1* | 9/2017 | Herron | A01D 61/008 |

\* cited by examiner (nt, et) : Tractor Current Position
(ndes, edes) : Tractor Desired Path
Ψdes : Desired Heading Angle
Ψm : Measured Heading Angle
Ψerror : Error in Heading Angle

FIG. 7

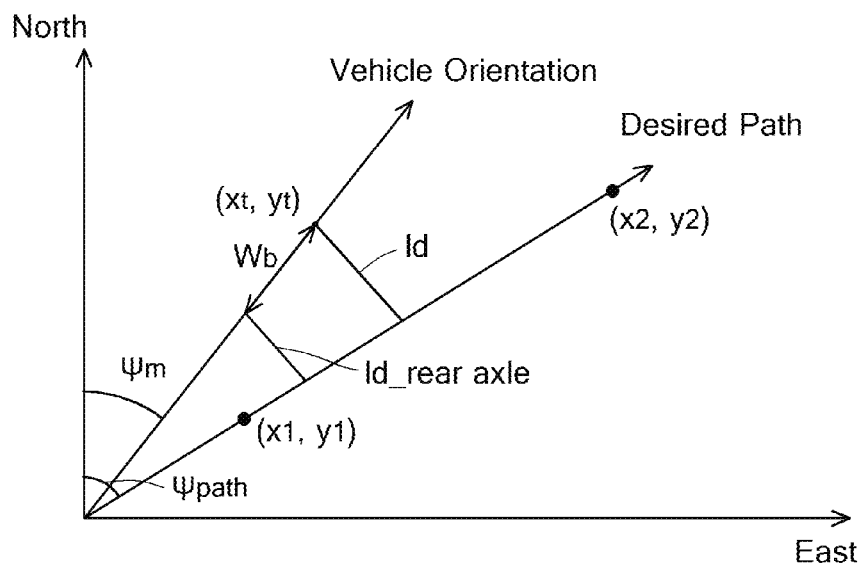

$\psi$path : Desired Path Heading (=tan-1(m))
$\psi$m : Measured Heading Angle
ld : Lateral Deviation at antenna position
  (=(mxt-yt+c)/√(m2+1))
ld_rear axle : Lateral Deviation at Rear Axle
  (=ld-|Wb|(Sin($\psi$error)))
m : (y2-y1)/(x2-x1)
(xt, yt) : Tractor Position Sensed by GNSS Antenna
(x1, y1) : start point of path
(x2, y2) : end point of path
Wb : distance between GNSS antenna and rear axle
  as distance rear axle is behind GNSS antenna position L2=L1-|Wb|Sinθ

L1 : Lateral Error between path and Antenna position
L2 : Lateral Error between path and Virtual Antenna position
θ : Angle between path and tractor heading (Heading Error)
Wb : Distance between GNSS antena position and Rear Axle L3=L1-|Wc|Sinθ

L1 : Lateral Error between path and Antenna position
L3 : Lateral Error between path and Virtual Antenna position
θ : Angle between path and tractor heading (Heading Error)
Wc : Distance between GNSS antena position and Virtual Antenna position

FIG. 15

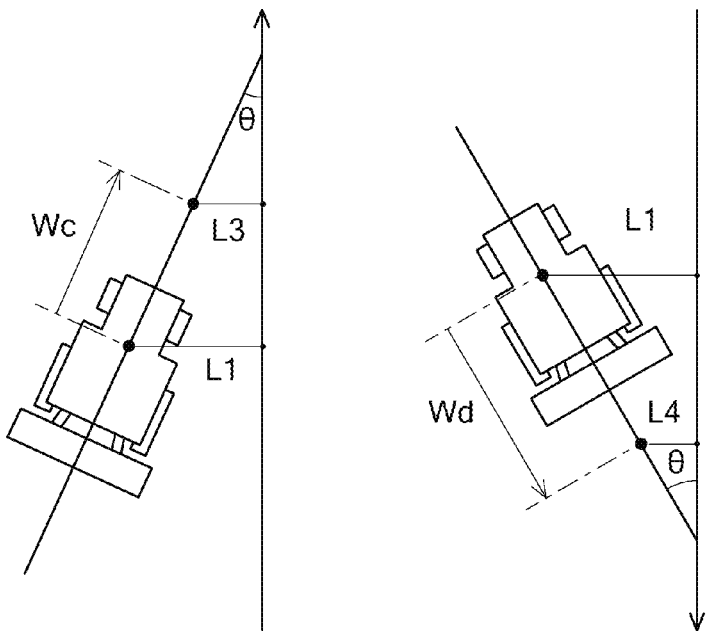

$L3 = L1 - |Wc|\sin\theta$
$L4 = L1 - |Wd|\sin\theta$

L1 : Lateral Error between path and Antenna position
L3 : Lateral Error between path and Virtual Antenna position
L4 : Lateral Error between path and Virtual Antenna position
θ : Angle between path and tractor heading (Heading Error)
Wc : Distance between GNSS antena position and Virtual Antenna position during forward movement
Wd : Distance between GNSS antena position and Virtual Antenna position during reverse movement

GUIDANCE CONTROL SYSTEM FOR AUTONOMOUS-TRAVELING VEHICLE

This application is a continuation under 35 U.S.C. § 120 to PCT/JP2015/084338, filed on Dec. 7, 2015, which is incorporated herein reference and which claimed priority to Indian Application No. 1824/MUM/2015, filed on May 7, 2015, The present application likewise claims priority under 35 U.S.C. § 119 to Indian Application No. 1824/MUM/2015, filed on May 7, 2015, the entire content of which is also incorporated herein by reference.

FIELD OF THE INVENTION

The present invention relates to the field of vehicle control system (automotive), and more particularly relates to a guidance control system for an autonomous robotic tractor.

BACKGROUND OF THE INVENTION

Designs of autonomous vehicles are seeing rapid growth in both variety and capability. Autonomous vehicles and aircrafts were initially designed for military purposes such as, but not limited to, navigation, video surveillance over enemy territory, and the like. Recently, the autonomous vehicles are being used in non-military applications as well. The non-military autonomous vehicle functionality has, until recently, been limited to radio-controlled (RC) aircraft being used as platforms to carry a sensor such as a digital camera that is connected to a ground station via a secondary line-of-sight radio data link.

Components have also been used to advance the field of robotics and physical computing. The resultant state of the art of autonomous vehicle design may be said to reflect the use of microelectronics and integrated circuit boards.

The current autonomous vehicles comprises of a controller unit that receives guidance signals from a guidance system and based on the received guidance signals, controls the vehicle. The guidance systems can be present on ground or at remote control stations. The control system can send guidance data to the controller unit on-board of the autonomous vehicle. Earlier guidance system did not use different guidance phase and have used either lateral control or heading control system in outer loop along with yaw rate control in inner loop or parallel control (heading and lateral control) but did not control yaw rate. The fundamental concept of controlling both i.e., vehicle's heading angle and lateral error within substantial low margin is challenging. In the existing art, the problem lies in maintaining the error for vehicle lateral deviation lower than a predetermined value and lower heading error and also stability, such scenario can be seen for example in optimized autonomous farming.

JP 2002-358122 A discloses a technique for facilitating an autonomous vehicle navigation following a target path. Specifically, in the technique of JP 2002-358122 A, the system includes: a heading sensor for detecting the heading angle of the vehicle; a GPS sensor for determining a vehicle position; autonomous navigation means for following the target path using the centre position between front wheels; and compensation means for following the target path using the position of the GPS sensor.

CITATION LIST

Patent Literature

PTL 1: JP 2002-358122 A

SUMMARY

The conventional arts are developed in a guidance control in front movement of the vehicle for tracing the target path with accuracy. However, depending on size or shape of agricultural field, there exist needs to frequently switch between forward movement and backward movement. The conventional arts did not consider a guidance control method in such situation. For example, as shown in FIG. 17, (1) turning near the ridges, (2) turnabout before exit from the agricultural field, or finishing the headland area. Especially, it is well known if the agricultural field is small as in Japan, there needs a lot of switching between forward movement and backward movement.

Therefore, there is a need for an automated guidance system for providing controlled navigation to unmanned vehicle and/or autonomous robotic vehicle so that it can function independently based on the predefined static planned path data (involving forward movement, turning, and backward movement).

The present invention discloses a guidance control system for an autonomous vehicle such as an autonomous robotic tractor which facilitates unmanned navigation where the functional operations are performed by the autonomous vehicle itself. For example, autonomous robotic tractor facilitates unmanned vehicle navigation and self-executed functional operation of the tractor in an agricultural application. The primary objective of the guidance is to ensure complete autonomous operations from the start till the end of cultivation, ensure safety, control the tractor position and also ensure tractor movement according to predefined path, which includes different manoeuvres. For optimized farming, guidance needs to maintain lateral error and heading errors within substantial low margin in cultivation area with different soil conditions and in the presence of different ground disturbance. During autonomous operation user can change the speed and hitch operations based on the cultivation requirement.

The autonomous robotic tractor navigates through the agricultural field and functions based on the algorithm stored in the electronics control unit (ECU). The functional navigation of the vehicle is based on the path data stored in ECU and on the signals received via global navigation satellite system sensor using global positioning system (GPS) technology. The autonomous guidance enables robotic tractor to navigate through the planned path.

The first embodiment of the present invention is a guidance control system for an autonomous vehicle, wherein the vehicle performs an autonomous navigation and operation while a position of the vehicle is measured using a satellite navigation system, characterized in that when the vehicle moves backward, a virtual antenna position is set in a backward position by a predetermined distance from an antenna position for receiving a signal from the satellite navigation system, and a lateral control is performed using a lateral error from a target path at the virtual antenna position.

The system according to the first embodiment preferably comprises an antenna position compensation module for providing guidance control signal to the autonomous vehicle during selection of virtual antenna position; a vehicle navigation module for providing guidance control signal to track the navigation of the vehicle based on pre-defined path data; a lateral control module connected to the antenna position compensation module for controlling the lateral error; a heading control module connected to the vehicle navigation module for controlling heading error by correcting the difference between desired heading and actual heading of the vehicle; and an yaw rate control module connected to the lateral control module and the heading control module for providing a steer control signal.

In one embodiment, the guidance control system further comprises a feed forward control module connected to the vehicle navigation module for correcting deviation from the pre-defined path due to discontinuity of curvature.

In the second embodiment of the present invention, is a guidance control system for an autonomous vehicle, wherein the vehicle performs an autonomous navigation and operation while a position of the vehicle is measured using a satellite navigation system, characterized in that when the vehicle moves forward, a virtual antenna position is set in a forward position by a predetermined distance from the antenna position for receiving the signal from the satellite navigation system, and the lateral control is performed using the lateral error from the target path at the virtual antenna position.

In a preferable embodiment, when lateral deviation or heading deviation from the target path exceeds beyond a certain limit, the vehicle is stopped and the autonomous navigation is stopped.

Advantageously, the autonomous navigation of the vehicle can be stopped by an override control operation using a remote control, and the autonomous navigation can be restarted from the stopped position.

According to the present invention, the autonomous vehicle is enabled to navigate through the predesigned path in the forward movement, turning, and reverse movement.

The aforementioned aspects and other features of the present invention will be explained in the following description, taken in conjunction with the accompanying drawings, wherein:

BRIEF DESCRIPTION OF THE ACCOMPANYING DRAWINGS

FIG. 7 illustrates a graph of trajectory of autonomous vehicle in a reverse movement, according to an embodiment of the present invention.

FIG. 15 illustrates GNSS antenna position compensation, according to an alternative embodiment of the present invention.

BRIEF DESCRIPTION OF THE INVENTION

Figure 1:
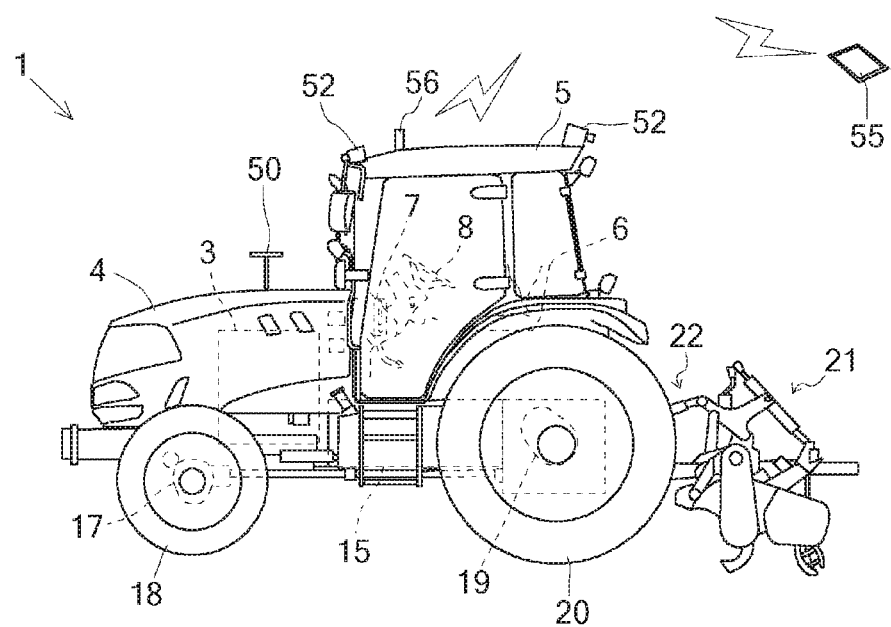
FIG. 1 illustrates a robot tractor as autonomous vehicle, according to an embodiment of the present invention.

The embodiments of the present invention will now be described in detail with reference to the accompanying drawings. However, the present invention is not limited to the present embodiments. The size, shape, position, number and the composition of various elements of the device of the invention is exemplary only and various modifications are possible to a person skilled in the art without departing from the scope of the invention. Thus, the embodiments of the present invention are only provided to explain more clearly the present invention to the ordinarily skilled in the art of the present invention. In the accompanying drawings, like reference numerals are used to indicate like components.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include operatively connected or coupled. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention discloses a guidance control system for an autonomous vehicle such as an autonomous robotic tractor. The system facilitates unmanned navigation where the functional operations are performed by the autonomous vehicle itself. For example, an autonomous robotic tractor facilitates unmanned vehicle navigation and self-executed functional operation of the tractor in an agricultural application. The primary objective of the guidance is to ensure complete autonomous operations from the start till the end of cultivation, ensure safety, control the tractor position and also ensure tractor movement according to predefined path, which includes different manoeuvres. For optimized farming, guidance needs to maintain lateral error and heading errors within substantial low margin in cultivation area with different soil conditions and in the presence of different ground disturbance. During autonomous operation user can change the speed and hitch operations based on the cultivation requirement.

Figure 2:
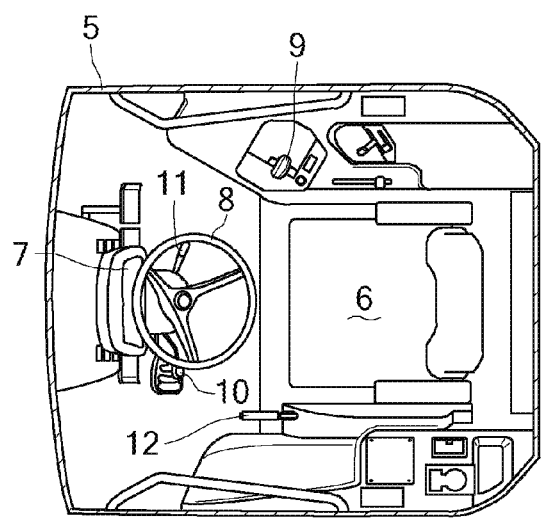
FIG. 2 illustrates a schematic view inside the robot tractor, according to an embodiment of the present invention.
Figure 3:
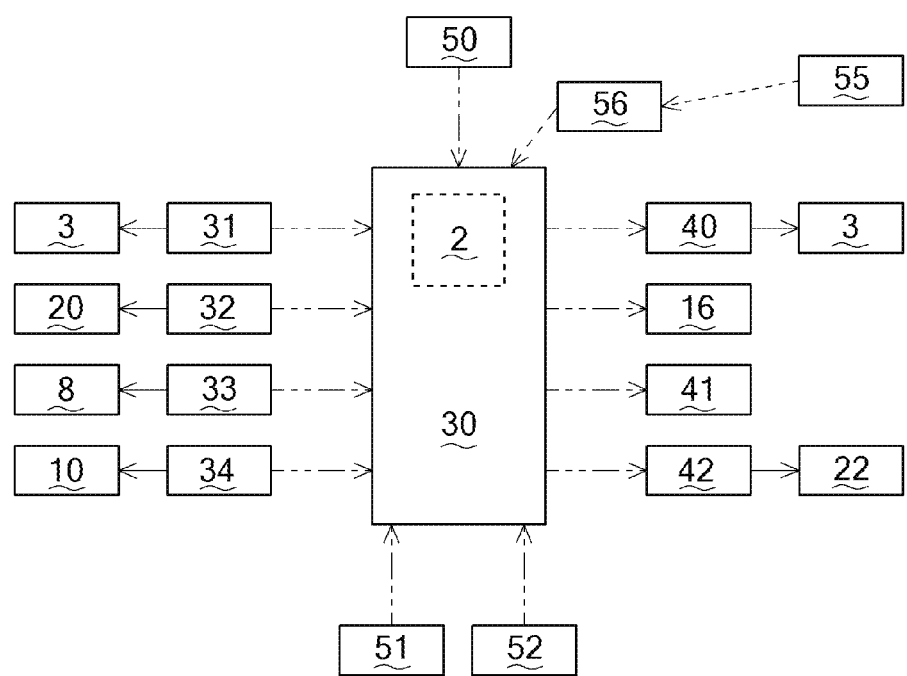
FIG. 3 illustrates a schematic diagram of controlling the robot tractor, according to an embodiment of the present invention.

FIGS. 1 to 3 illustrate a robot tractor (hereinafter simply "tractor") 1 as one embodiment of the autonomous vehicle according to the present invention and a guidance control system 2 for controlling the tractor 1. The tractor 1 is enabled to navigate and function autonomously without human operation. Specifically, the tractor 1 is controlled by the guidance control system 2 for movement along the predetermined path and operation at the predetermined location on the predetermined path.

The tractor 1 includes an engine 3 housed in a bonnet 4 and a cabin 5 disposed at the back of the bonnet 4. In the cabin 5, a driver's seat 6 and an instrumental panel 7 disposed in the front of the seat, and near the seat 6 and on the instrumental panel 7, operation tools are mounted such as a steering 8, a main shift lever 9, a forward-reverse lever 10, a lifting lever 11, and a PTO shift lever 12. As described, the tractor 1 has structure that can be operated by an operator.

Below the driver's seat 6, a transmission case 15 is located. The power of the engine 3 is transmitted to a transmission 16 in the transmission case 15, and the speed is changed by the transmission 16. The engine power is further transmitted to front wheels 18 supported by a front axle 17, to rear wheels 20 supported by a rear axle 19 and to PTO shaft driving a farm working machine 21. The working machine 21 is attached to the rear of the tractor via a three-point hitch 22, and the working machine 21 can be moved in the vertical direction and inclined along the horizontal direction by the operation of the three-point hitch 22 (hitch operation).

The tractor 1 includes an electrical control unit (ECU) 30 for controlling the operation thereof. The ECU 30 is electrically connected to a speed sensor 31 for detecting the speed of the engine 3, a speed sensor 32 for detecting the speed of the rear wheels 20, a steering angle sensor 33 for detecting the rotation angle of the steering 8 (or the rotation angle of the front wheels 18), and a position sensor 34 for detecting the position of the forward/reverse lever 10. These sensors transmit detection signals to the ECU 30. The ECU 30 is electrically connected to actuators of a governor 40 for controlling the speed of the engine 3, the transmission 16 for controlling the speed of the tractor 1, a steering unit 41 for controlling the heading (steering angle) of the tractor 1, and a lifter 42 for controlling the three-point hitch 22. The ECU 30 controls these actuators to control the operation of the autonomous tractor 1. The ECU 30 contains the guidance control system 2, so that the tractor 1 is operated autonomously based on the guidance control system 2.

On the bonnet 4, a global navigation satellite system (GNSS) antenna 50 is mounted for receiving a signal from GNSS as a satellite navigation system. The GNSS antenna 50 receives the signal from the navigation satellite and measure the position of the tractor 1. Moreover, the GNSS antenna 50 contains a heading sensor for detecting the heading angle of the tractor 1. The GNSS antenna 50 is electrically connected to the ECU 30, and transmits the detection signal from the navigation satellite to the ECU 30. In other words, the ECU 30 catches the position and heading angle of the tractor 1. It should be noted that the GNSS system using the navigation satellite is, for example a satellite navigation system using global positioning system (GPS) technology. Alternatively, the satellite navigation system may use other navigation satellites such as quasi-zenith satellites or GLONASS. As the GPS technology, single point positioning, relative positioning, differential GPS positioning, or RTK-GPS positioning may be employable.

The tractor 1 is provided with an obstacle sensor 51 for detecting obstacles, which are located in front, side and rear of the tractor. The obstacle sensor 51 is constructed by laser sensor, ultrasonic sensor or the like, and recognizes the presence of obstacles located front, side and rear of the tractor 1, and generates detection signals. The tractor 1 is also provided with a camera 52 for taking images of front, side and rear of the tractor. The obstacle sensor 51 and the camera 52 are connected to the ECU 30, and transmit the detection signals thereto.

When controlling the guidance control system 2 of the tractor 1 by remote control, wireless application such as a tablet 55 is used. The control signal from the tablet 55 is received by an antenna 56 mounted on the cabin 5 of the tractor 1. The antenna 56 is connected to the ECU 30, and sends the received control signal to the ECU 30.

Figure 4:
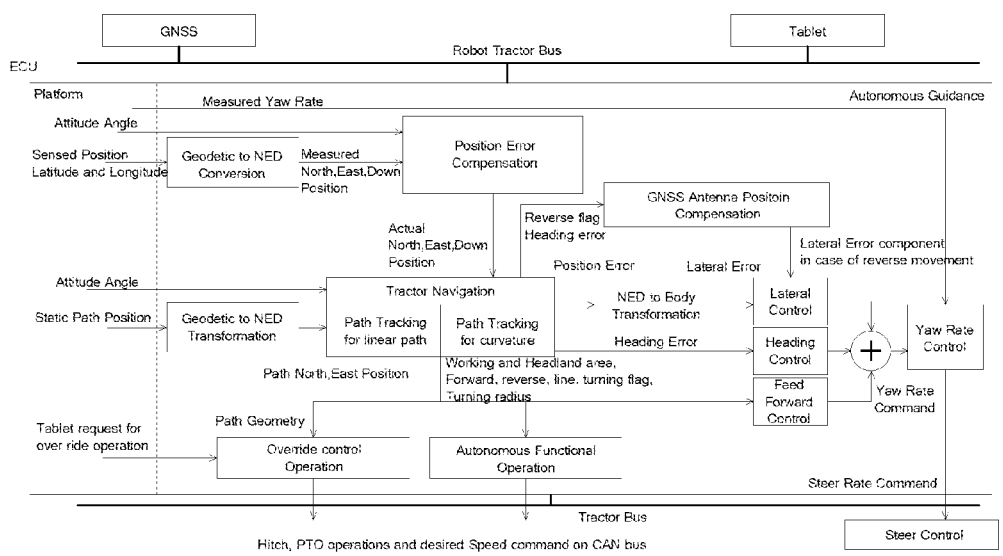
FIG. 4 illustrates a schematic diagram of autonomous guidance modules, according to an embodiment of the present invention.

FIG. 4 illustrates a schematic diagram of autonomous guidance modules according to an embodiment of the present invention. According to the embodiment, GNSS sends the attitude angle signals and sensed position signal in a CAN message format on a robot tractor bus. The platform within the ECU receives the CAN signals and converts them to a physical signal, which is in turn fed to autonomous guidance. The platform software reads the static path data which resides in the flash and provides static path detail to autonomous guidance in run time. The autonomous guidance calculates the desired command based on the sensed signals and static path data, and then sends a command to the Steer Control System on tractor bus. User is enabled to send the override signal on robot tractor bus to autonomous guidance using a tablet and autonomous guidance in turn responds to the override signals based on path geometry. The override control commands are sent by ECU on tractor bus.

The autonomous robotic tractor control laws are designed in order to reduce the lateral error and control vehicle heading. The guidance system facilitates the robotic tractor to operate functionally in autonomous mode.

I. Position Error Compensation Due to Tractor Inclination

The GNSS antenna is mounted on top of tractor, because of which there will be error in the position sensed due to vehicle inclination. The errors due to vehicle inclination are compensated using Attitude Angle.

$$\begin{bmatrix} Na \\ Ea \\ Da \end{bmatrix} = \begin{bmatrix} N \\ E \\ D \end{bmatrix} - C_B^N \begin{bmatrix} 0 \\ 0 \\ h \end{bmatrix} \quad \text{[Formula 1]}$$

Na, Ea, Da: Actual Values (North, East, Down)
N, E, D: Measured Values (North, East, Down)
$C_B^N$: Transformation matrix from Body frame to NED frame
h: GNSS antenna position height from Ground II. Tractor Navigation Tractor navigation algorithm facilitates guidance system to track the navigation of the vehicle based on pre-loaded static path data. The path tracking method varies for linear path and curvature path because the impact of the vehicle heading is pivotal for the navigation in curvature path whereas the lateral control is predominant during navigation in linear path.

Geodetic to North-East-Down (NED) Transformation

The position sensed as well as static path positional data of the vehicle, which are detected as geodetic latitude, longitude, and altitude, are transformed into NED coordinate system which is one of the horizontal rectangular coordinate systems. The NED coordinate data is used for calculating position error and heading.

Figure 5:
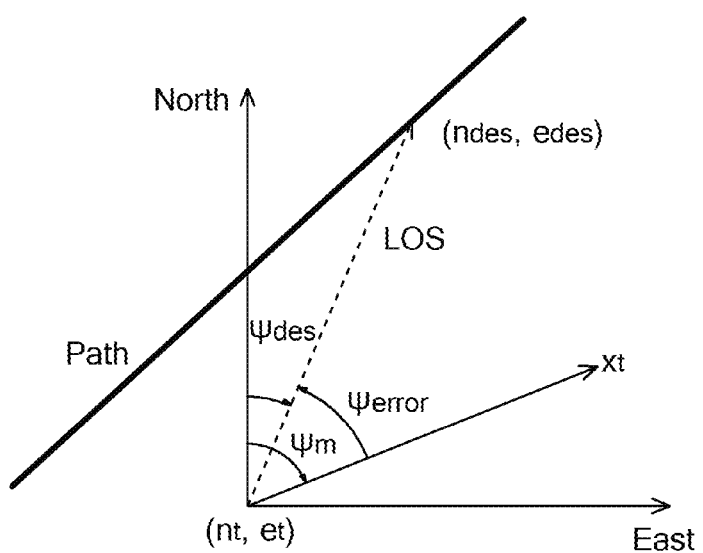
FIG. 5 illustrates a graph of trajectory of autonomous vehicle in a linear path, according to an embodiment of the present invention.

FIG. 5 illustrates a graph of trajectory of autonomous vehicle in a linear path according to an embodiment of the present invention. The guidance law is mainly based on parallel navigation where the desired yaw rate is derived by demanding Line Of Sight (LOS) rate to zero. For LOS rate to become zero, vehicle has to be driven in LOS vector.

Figure 6:
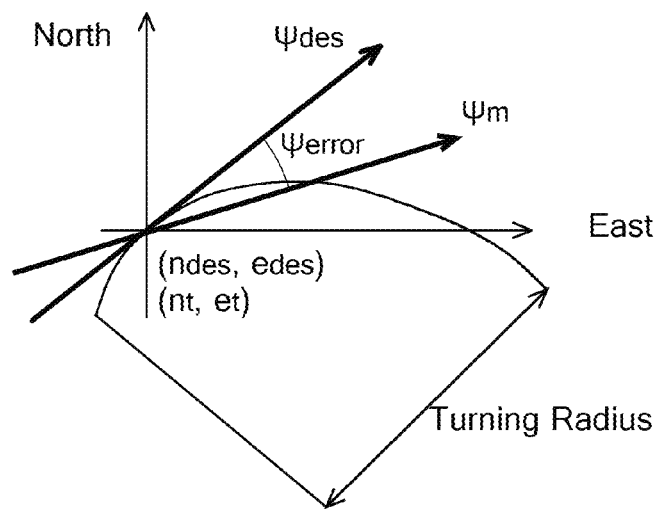
FIG. 6 illustrates a graph of trajectory of autonomous vehicle in a curvature path, according to an embodiment of the present invention.

FIG. 6 illustrates a graph of trajectory of autonomous vehicle in a curvature path according to an embodiment of the present invention. In the heading control, the desired heading is derived from the path geometry instead of parallel navigation concept.

The path tracking algorithm extracts the following information from static path based on the current position of tractor and it provides the extracted information to other guidance modules
  Desired path data, Turning radius, Start and stop points
  Working area and Head land area
  Driving condition i.e., Straight Line or Turning
  Forward or reverse direction of movement The above information is used by control module for different guidance phases as well as autonomous functional operations.

FIG. 7 illustrates a graph of trajectory of autonomous vehicle in a reverse movement according to an embodiment of the present invention. In this embodiment, Desired Heading and Lateral Error are depicted graphically in the embodiment of reverse movement.

III. NED to Tractor Body Transformation

The positional errors are transformed to local body frame using Euler angle. It eliminates the complexities of controlling the vehicle navigation in global coordinate system and thereby enhancing the accuracy of the system.

IV. Control Strategies

Figure 8:
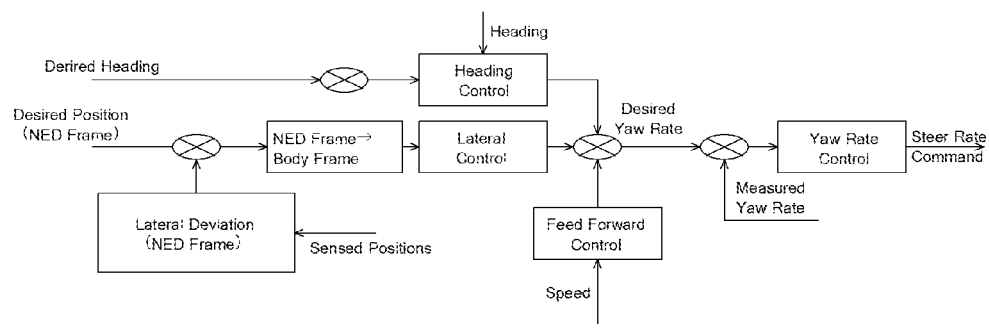
FIG. 8 illustrates a block diagram of overall control strategy, according to an embodiment of the present invention.

FIG. 8 illustrates a block diagram of overall control strategy/system. The control laws developed are fundamentally based on cascade control system with feedback and feed forward control loops.

Feedback Control System:

Lateral control is designed and implemented in parallel to heading control in outer loop in order to improve the lateral error of the vehicle as well as vehicle heading. The yaw rate control is implemented in an inner loop to derive the steer rate and to provide the robustness of overall guidance system. The inner loop controls the sensitivity of the system from various disturbances like ground irregularities, sensor noise and electro-hydraulic steer system non-linearity.

Lateral Control:

The lateral error (Yerror) is calculated as the minimum distance of the tractor from the predefined path. Lateral Controls lateral error which is calculated in NED frame and transformed to body frame as command will be in body Y frame.

Heading Control:

It controls the heading error, and the heading error is calculated as the difference between desired heading and actual heading of the tractor. The heading control has dominant effect during curvature path navigation.

Yaw Rate Control:

Yaw Rate control is implemented in an inner loop and output of the outer loop controllers, i.e. lateral deviation and heading angle, are compared with reference input of measured yaw rate. The output of yaw rate control is steer rate command which is input to steer system.

Lateral, Heading, Yaw rate control laws are proportional derivative (PD) control system.

$$\text{Controller, } K_{control} = K_p + K_d \Sigma \quad \text{[Formula 2]}$$

$K_p$: Proportional Gain
$K_d$: Derivative Gain

Figure 9:
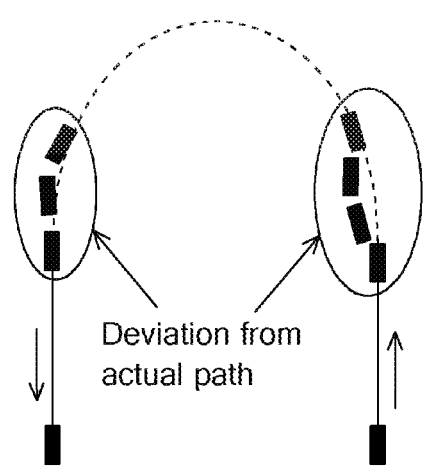
FIG. 9 illustrates a trajectory of deviation in path due to discontinuity of curvature, according to an embodiment of the present invention.

Feed Forward Control System:

FIG. 9 illustrates a trajectory of deviation in path due to discontinuity of curvature. The discontinuity in curvature exists at the intersection of linear and curvature path segment, resulting in vehicle movement deviation. In addition to the feedback control strategies, feed forward controller is designed to eliminate system overshoot during transition of path from linear to a curvature path and vice versa. The feed forward control is function of turning radius and speed.

Control Gain Scheduling:

The controller gain scheduling has been implemented in order to optimize system stability due to disturbances and also for reducing the errors. The control gains are characterized as the function of vehicle speed.

V. GNSS Antenna Position Compensation

Figure 10:
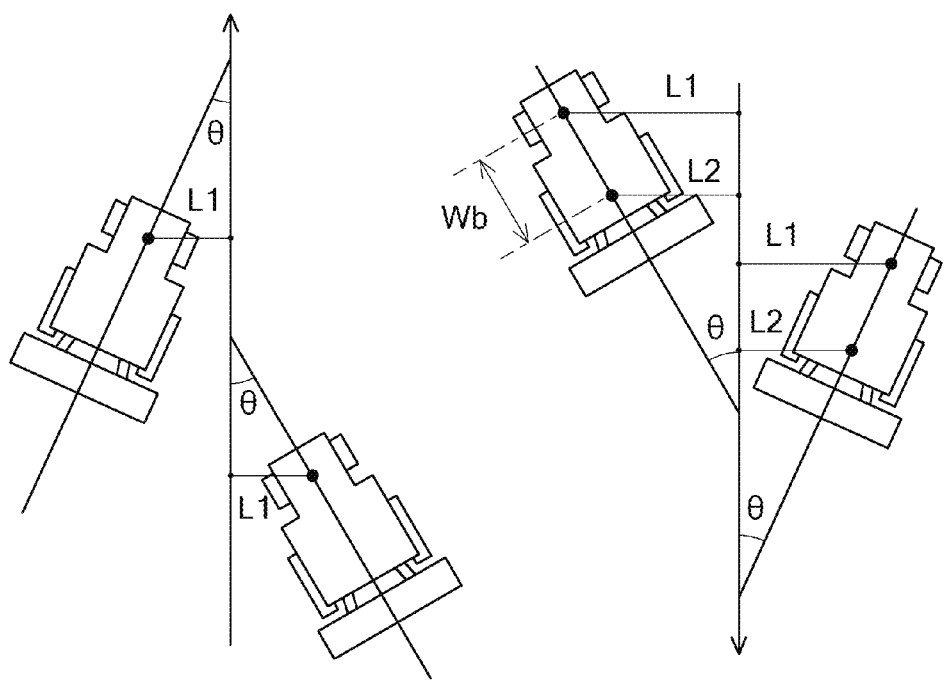
FIG. 10 illustrates GNSS antenna position compensation, according to an embodiment of the present invention.

FIG. 10 illustrates a GNSS antenna position compensation according to an embodiment of the present invention. The GNSS antenna position compensation is an essential feature in providing guidance control to an autonomous vehicle. During transient phase the antenna position plays a critical role. If the antenna is positioned at the front of tractor, the lateral error is identified sooner as shown in FIG. 8, which helps in reducing the system lag and thereby overall transient response is improved.

But in the case of reverse control, the lateral errors are identified late with reference to back position of tractor. So in order to improve the transient response, the lateral error (L2) are mathematically computed for back position based on the heading error and lateral error with reference to GNSS antenna position (L1). That is, the back position of tractor is set as a virtual antenna position and the reverse movement is controlled based on the back position of tractor, whereby transient response is improved.

VI. Guidance Phases

In order to ensure complete autonomous operation for the entire field and different manoeuvres, different guidance phases are required. Following control strategies are used for different guidance phases.

1. Straight Line: In this phase the outer loop control is lateral and heading control while the inner loop control is yaw rate control. Heading control uses desired heading as input which is derived based on the parallel navigation concept.
2. Turning: In this phase the outer loop control is lateral, heading control and feed forward control while the inner loop control is yaw rate control. Heading control uses desired heading as input which is derived based on the path geometry.
3. Reverse movement: In this phase first steer control is used in order to make sure that the steer angle is zero before any movement in reverse direction. In reverse control, lateral error is calculated at rear wheel rather than at front wheel.

VII. Autonomous Functional Operation

The autonomous guidance system also carries out the following functional operations.
1. The autonomous hitch and PTO operation based on cultivation area, non-cultivation area and based on pre-loaded static path, positional data of vehicle.
2. Autonomous mode will not be initiated if the tractor is not within the range of starting point. This functionality is ensured by checking the actual position along with orientation of robotic tractor against the starting point of static path pre-defined in ECU.
3. The system needs to ensure that the deviation in path following (lateral deviation and heading deviation) does not exceed beyond a certain limit. If the limit exceeds due to certain reasons, the autonomous mode is stopped.
4. Robotic tractor comes out of autonomous mode and stops at the end of cultivation. This is achieved based on the information stored in the navigation path and actual position of tractor.
5. Stops the autonomous operation if any of the obstacles is detected by the sensor (e.g., obstacle detection sensor or camera).

VIII. Override Control Operations

During autonomous operation, user is enabled to change the following signals using a remote control (such as tablet), depending on the guidance which determines the override control based on the Path Geometry. Moreover, after the tractor is stopped by the override control using the remote control, the autonomous operation of the tractor can be restarted at the same point where the tractor is stopped.

Change of tractor Speed for working and headland area

Hitch and PTO operations for working and headland area

Figure 11:
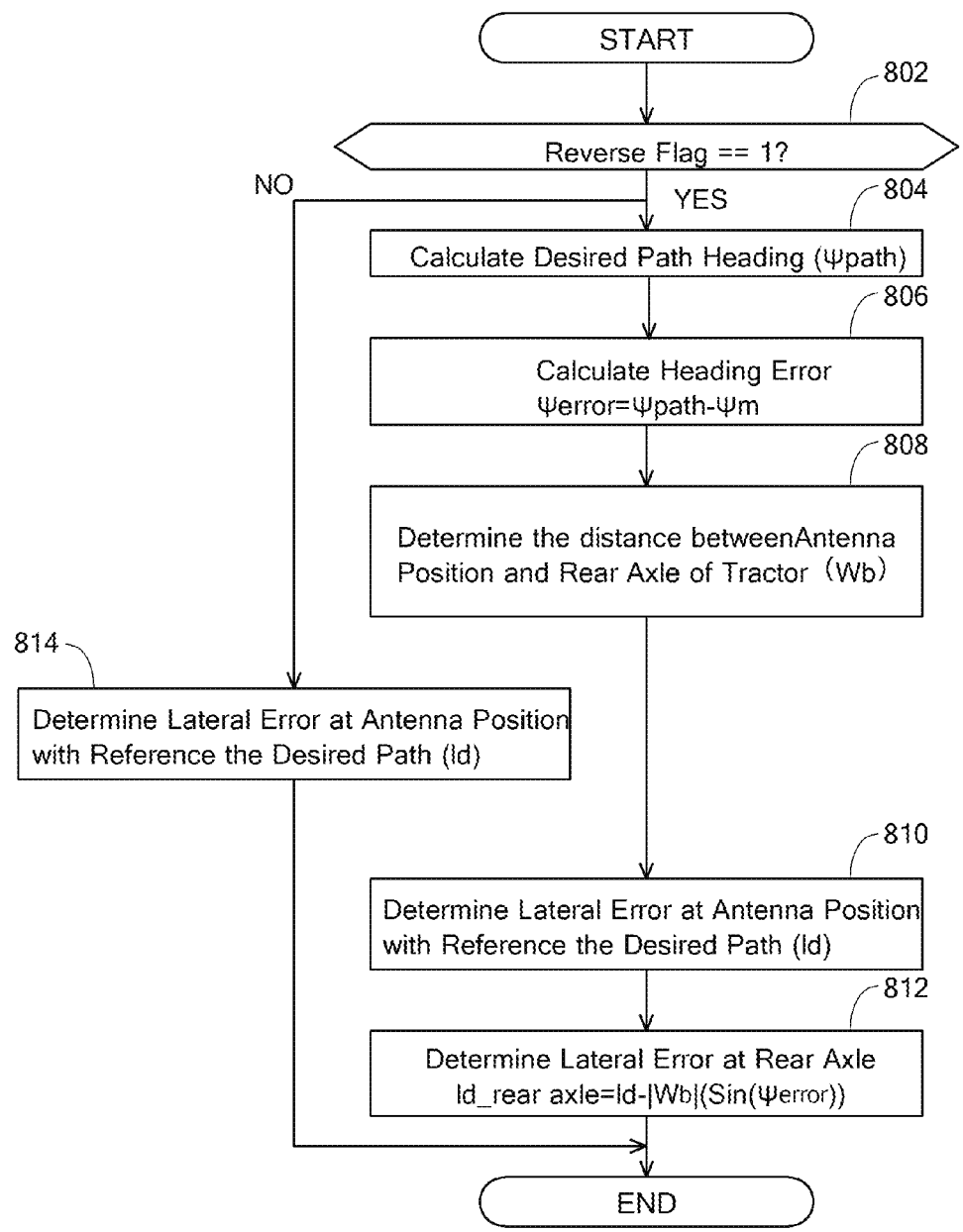
FIG. 11 illustrates a flow chart of GNSS antenna position compensation, according to a preferred embodiment of the present invention.

FIG. 11 illustrates a flow chart of GNSS antenna position compensation according to a preferred embodiment of the present invention. At step 802, a check is performed whether the reverse flag is set to 1. If the reverse flag is set to 1, then at step 804, the desired path heading ($\psi_{path}$) is calculated. At step 806, the heading error ($\psi_{error}=\psi_{path}-\psi_m$) is calculated. At step 808, the distance between antenna position and rear axle of tractor (Wb) is determined. At step 810, the lateral error at antenna position with reference to the desired path ($I_d$) is determined. At step 812, the lateral error at rear axle ($I_{d\_rear\_Axle}$) is determined. If the reverse flag is not set to 1, then at step 814, the lateral error is determined at the antenna position with reference to the desired path ($I_d$). In one embodiment of the reverse movement, the lateral error at rear axle is used for the lateral control.

Alternative Embodiment

Figure 12:
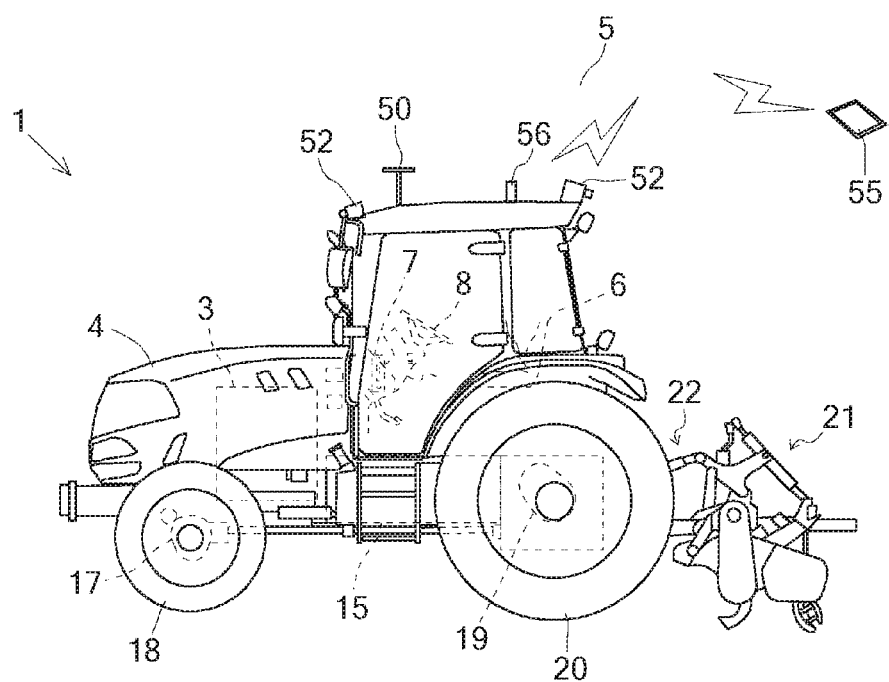
FIG. 12 illustrates a robot tractor as autonomous vehicle, according to an alternative embodiment of the present invention.
Figure 16:
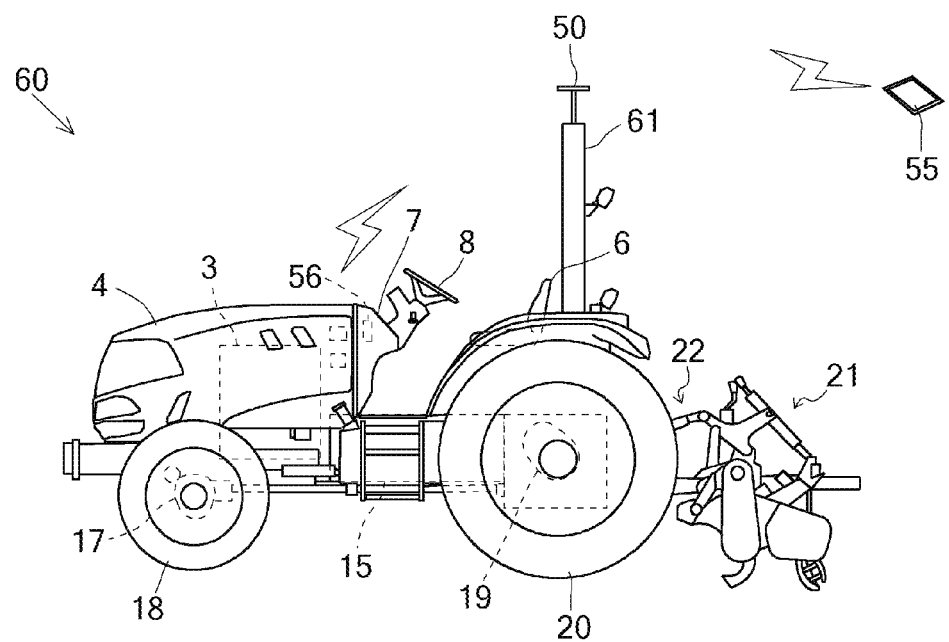
FIG. 16 illustrates a robot tractor, according to another preferred embodiment of the present invention.
Figure 17:
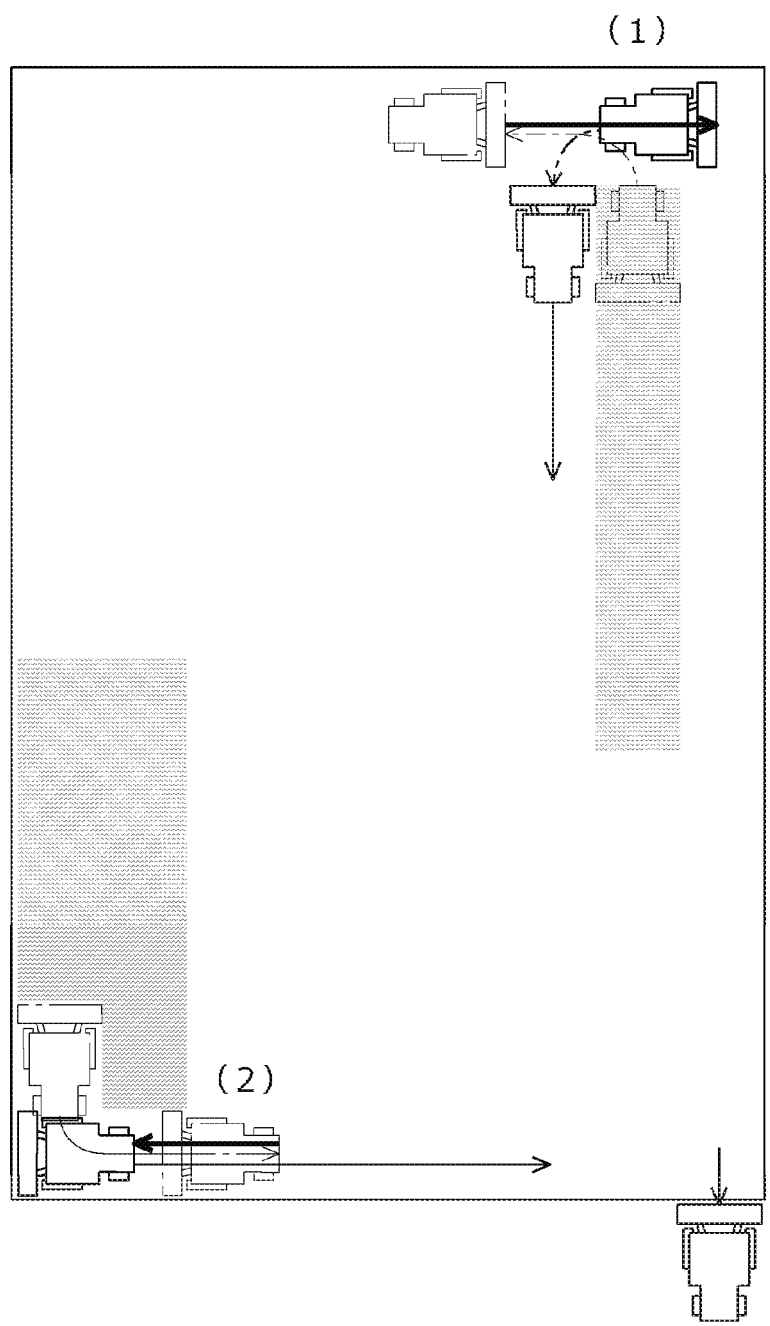
FIG. 17 illustrates a situation where switching between forward movement and backward movement is frequently operated.

Referring to FIGS. 12 to 16, an alternative embodiment regarding GNSS Antenna Position compensation is explained below. In this embodiment, the GNSS antenna 50 is mounted on the middle or rear of the tractor 1, in which the GNSS antenna 50 is not mounted on the front of the tractor 1. FIG. 12 illustrates an embodiment where the GNSS antenna 50 is mounted on the front end of the cabin 5 of the tractor 1. FIG. 16 illustrates an embodiment where the GNSS antenna 50 is mounted on a roll bar 61 disposed at rear end of a tractor 60 without cabin.

As illustrated in FIG. 12, the GNSS antenna 50 is located at the front end of the cabin 5. As the GNSS antenna 50 is located at the top of the cabin 5, the GNSS antenna 50 is not influenced by vibration of tractor 1. Further, the GNSS antenna 50 is located at the highest position in the tractor 1, and the receiving sensitivity can be improved.

Figure 13:
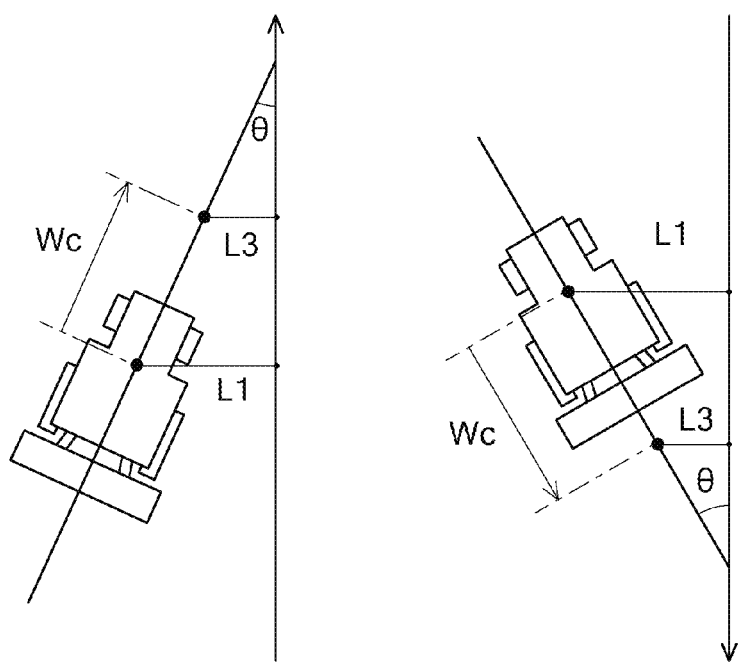
FIG. 13 illustrates GNSS antenna position compensation, according to an alternative embodiment of the present invention.

FIG. 13 illustrates GNSS antenna position compensation according to another embodiment of the present invention. In this embodiment, the virtual antenna position is set not only in the reverse movement control but also in the forward movement control. In the reverse and forward movement control, the virtual antennas are positioned in the moving direction, and the lateral control is performed based on the compensated position of the virtual antenna.
1. Forward Movement Control: In order to improve the transient response, the lateral error (L3) is mathematically computed for forward position by the predetermined distance (Wc) based on the heading error and lateral error with reference to GNSS antenna position (L1). That is, the lateral control is performed based on the virtual antenna position which is set in forward from the real GNSS antenna position, thereby improving the transient response.
2. Reverse Movement Control: In order to improve the transient response, the lateral error (L3) is mathematically computed for backward position by the predetermined distance (Wc) based on the heading error and lateral error with reference to GNSS antenna position (L1). That is, the lateral control is performed based on the virtual antenna position which is set in backward from the real GNSS antenna position, thereby improving the transient response.

Figure 14:
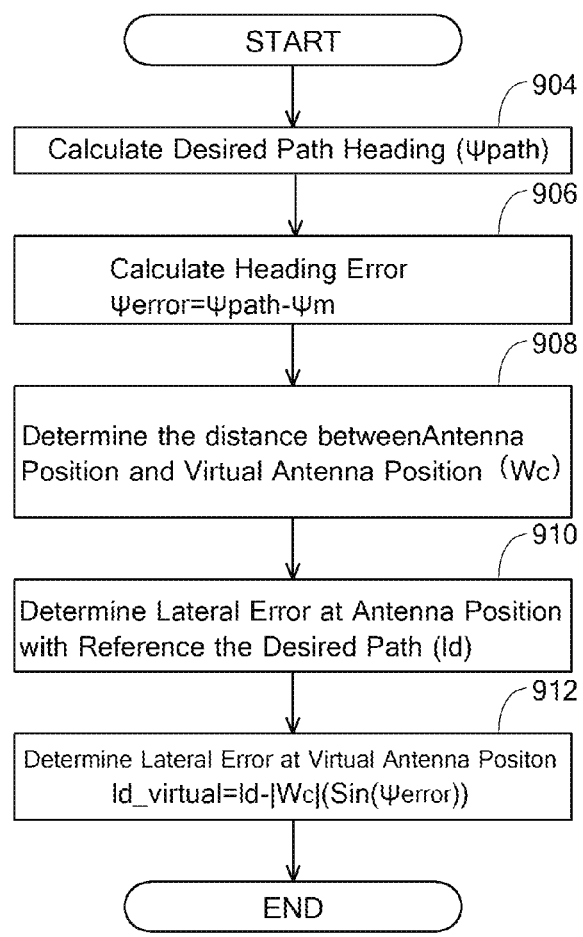
FIG. 14 illustrates a flow chart of GNSS antenna position compensation, according to an alternative embodiment of the present invention.

FIG. 14 illustrates a flow chart of GNSS antenna position compensation according to an alternative embodiment of the present invention. At step 904, the desired path heading ($\psi_{path}$) is calculated. At step 906, the heading error ($\psi_{error}=\psi_{path}-\psi_m$) is calculated. At step 908, the distance between antenna position and virtual antenna position (Wc) is determined. At step 910, the lateral error at antenna position with reference to the desired path ($I_d$) is determined. At step 912, the lateral error at the virtual antenna position ($I_{d\_virtual}$) is determined. As described above, in this embodiment, the GNSS antenna position compensation is performed based on the same flow in both the forward movement and reverse movement.

FIG. 15 illustrates GNSS antenna position compensation according to another embodiment of the present invention. In this embodiment, the virtual antenna position is set not only in the reverse movement control but also in the forward movement control. In the reverse and forward movement control, the virtual antennas are positioned in the moving direction, and the lateral control is performed based on the compensated position of the virtual antenna.
1. Forward Movement Control: in order to improve the transient response, the lateral error (L3) is mathematically computed for forward position by the predetermined distance (Wc) based on the heading error and lateral error with reference to GNSS antenna position (L1). That is, the lateral control is performed based on the virtual antenna position which is set in forward from the real GNSS antenna position, thereby improving the transient response.

2. Reverse Movement Control: In order to improve the transient response, the lateral error (L4) is mathematically computed for backward position by the predetermined distance (Wd) based on the heading error and lateral error with reference to GNSS antenna position (L1). That is, the lateral control is performed based on the virtual antenna position which is set in backward from the real GNSS antenna position, thereby improving the transient response.

In this embodiment, the distance to compute the lateral error in reverse movement control differs from the distance to compute the lateral error in forward movement control. Thus, changing the position where the virtual antenna is located, the optimum positions of the virtual antennas for forward movement control and reverse movement control can be set, thereby improving the sensitivity for detecting the lateral errors (L3, L4).

As illustrated in FIG. 16, a robot tractor 60 as alternative embodiment of the autonomous vehicle according to the present invention differs from the tractor 1 in the cabin 5. However, the robot tractor 60 includes almost same structures as the tractor 1. The GNSS antenna 50 is located on the top of the roll bar 61 which is disposed at the rear end of the robot tractor 60. The antenna 56 may be provided in the instrumental panel 7. In this embodiment, the GNSS antenna position compensation can be employed. It should be noticed that in the robot tractor 60, the GNSS antenna 50 is located at the rear end, and due to the structure, the GNSS antenna position compensation may be employed in the forward movement control. In other words, in the forward movement control, the virtual antenna position is set, and on the other hand, in the reverse movement control the real antenna position is used.

This invention overcomes the problems involved in guiding the autonomous vehicle within constraint of specific deviation i.e., within the predetermined accuracy, maintaining stability in path following (including different turns) from the pre-defined path.

In the prior art, guidance systems did not support different guidance phases, they did not account for GNSS antenna position compensation for reverse control and there is no composite control. Also, previously the lateral control did not calculate the command in body frame. Additionally, earlier concept did not ensure various autonomous operations for different field sizes and shapes while maintaining safety of autonomous operation in absence of the operator in tractor.

According to the present invention, the concept is composite control which is based on heading and modified lateral deviation control (parallel) in outer loop and yaw rate control in inner loop. In the present control design, the yaw rate control demands steer rate rather than steer angle. The enhanced control design leads to the improvement of vehicle positioning, heading and also maintaining stability of the system in the presence of ground disturbances, different soil conditions and steer system non-linearity. The high-level requirement for error in the vehicle position, enhances the complexity in controlling robotic tractor, thus the newly designed control laws with proper gain scheduling technique resolves such complexity and achieves desired constraint.

In the present invention, the guidance ensures that the autonomous operations on the field are initiated by checking autonomous start condition with reference to the static path. The autonomous mode is stopped at the end of static paths (end of complete cultivation) in order to ensure that tractor doesn't go out of the field. The guidance enables various autonomous operations for different field sizes and shapes while ensuring safety by continuously monitoring tractor deviation and stops in case of significant deviation. The present invention does not require an operator in tractor, allows the user to monitor autonomous operations, change tractor speed within limit and hitch operation from remote location through the remote control such as the tablet. If the tractor is stopped by the remote control, the autonomous operation of the tractor can be restarted from the stopped position.

The guidance control explained in the present invention is generic and it can be further extended, not limited to autonomous vehicle for agricultural application, for autonomous passenger vehicle navigation.

All equivalent relationships to those illustrated in the drawings and described in the application are intended to be encompassed by the present invention. The examples used to illustrate the embodiments of the present invention, in no way limit the applicability of the present invention to them. It is to be noted that those with ordinary skill in the art will appreciate that various modifications and alternatives to the details could be developed in the light of the overall teachings of the disclosure, without departing from the scope of the invention.

Although the invention of the guidance control system and method for an autonomous vehicle has been described in connection with the embodiments of the present invention illustrated in the accompanying drawings, it is not limited thereto. It will be apparent to those skilled in the art that various substitutions, modifications and changes may be made in the guidance control system without departing from the scope and spirit of the invention.

INDUSTRIAL APPLICABILITY

The invention can be applicable to a guidance control method for navigating an autonomous vehicle along a target path.

DESCRIPTION OF NUMERALS

1: Robot Tractor, 2: Guidance Control System, 5: Cabin, 21: Cultivator, 50: GNSS Antenna, 55: Tablet

The invention claimed is:

1. A guidance control system for an autonomous vehicle, the guidance control system comprising:
an antenna position compensation module for providing guidance control signal to the autonomous vehicle during selection of a virtual antenna position;
a vehicle navigation module for providing guidance control signal to track the navigation of the autonomous vehicle based on pre-defined path data; and
a lateral control module connected to the antenna position compensation module for controlling a lateral error,
wherein the autonomous vehicle performs an autonomous navigation and operation while a position of the autonomous vehicle is measured using a satellite navigation system, and
wherein when the autonomous vehicle moves backward, the virtual antenna position is set in a backward position by a predetermined distance from an antenna position for receiving a signal from the satellite navigation system, and a lateral control is performed using the lateral error from a pre-defined path at the virtual antenna position.

2. The guidance control system according to claim 1, further comprising:
   a heading control module connected to the autonomous vehicle navigation module for controlling heading error by correcting the difference between desired heading and actual heading of the autonomous vehicle; and
   an yaw rate control module connected to the lateral control module and the heading control module for providing a steer control signal.

3. The guidance control system according to claim 2 further comprising a feed forward control module connected to the autonomous vehicle navigation module for correcting deviation from the pre-defined path due to discontinuity of curvature.

4. The guidance control system according to claim 1, wherein when the autonomous vehicle moves forward, the virtual antenna position is set in a forward position by a predetermined distance from the antenna position for receiving the signal from the satellite navigation system, and the lateral control is performed using the lateral error from the pre-defined path at the virtual antenna position.

5. The guidance control system according to claim 1, wherein when lateral deviation or heading deviation from the pre-defined path exceeds beyond a certain limit, the autonomous vehicle is stopped and the autonomous navigation is stopped.

6. The guidance control system according to claim 1, wherein the autonomous navigation of the autonomous vehicle is stopped by an override control operation using a remote control, and the autonomous navigation is restarted from the stopped position.

* * * * *